United States Patent [19]
Hickman et al.

[11] Patent Number: 6,091,509
[45] Date of Patent: Jul. 18, 2000

[54] PRINTER SYSTEM AND METHOD FOR SENDING DATA HINTS OF UPCOMING DATA

[75] Inventors: Mark S. Hickman; Thieu X. Dang, both of Vancouver; James E. Moore, Sr., Brush Prairie, all of Wash.

[73] Assignee: Hewlett-Packard Company, Palo Alto, Calif.

[21] Appl. No.: 08/885,109

[22] Filed: Jun. 30, 1997

[51] Int. Cl.[7] .............................. B41B 15/00; B41J 15/00; G06F 15/00
[52] U.S. Cl. ...................... 358/1.16; 358/1.15; 358/1.17; 358/1.18
[58] Field of Search ..................................... 395/108, 109, 395/101, 104, 113, 114, 116, 117; 400/708; 358/434, 1.8, 1.9, 1.1, 1.4, 1.14, 1.15, 1.17, 1.18, 1.16

[56] References Cited

U.S. PATENT DOCUMENTS 5,490,237  2/1996  Zimmerman et al. ................... 395/115
5,639,171  7/1997  Brewster, Jr. et al. .................. 400/708
5,644,683  7/1997  Ross et al. ............................... 395/108

*Primary Examiner*—Joseph Mancuso
*Assistant Examiner*—Twyler Lamb

[57] ABSTRACT

A printer is equipped with a small-size memory buffer for holding row data. A printer driver creates data hints that are sent to the printer before the entire data set is downloaded to the memory buffer. The data hint contains a color type to specify whether the row is black only, color only, or a combination of black and color. The data hint also contains information pertaining to the leftmost non-zero pixel position and a rightmost non-zero pixel position to be printed in the row. The printer has a swath manager configured to receive the data hints and prepare the printer to print the data set associated with the data hints. The swath manager relies on the data hints to make swathing decisions regarding the color of the row and where to position the print head carriage (or other print mechanism) in preparation for printing. As a result, the swath manager need not wait for the set of data to arrive before determining the color content of the row or the outer boundaries of the pixel data. Additionally, the printer can receive data in parallel with taking steps to prepare to print the data.

23 Claims, 2 Drawing Sheets

PRINTER SYSTEM AND METHOD FOR SENDING DATA HINTS OF UPCOMING DATA

TECHNICAL FIELD

This invention relates to systems and methods for sending print data to printing devices. More particularly, this invention relates to systems and methods for sending data hints prior to the print data to prepare the printing device to print the forthcoming data.

BACKGROUND OF THE INVENTION

In conventional printing systems, a printer driver resident at a host computer prepares and sends data to the printer. The printer is equipped with a memory of sufficient size to store enough data to print multiple swaths. From this data, the printer makes decisions regarding how to print the data. For example, the printer determines the color type and outside pixel boundaries for each swath and uses this information to prepare the paper position, the print head position, and so forth for printing the swath. The buffer memory in conventional printers held sufficient data to make these decisions.

The printing environment is fiercely competitive. There is an ever-present pressure to reduce the cost for printers without degrading their quality. Reducing memory size in the printer is one approach to cutting costs. This poses a problem, however, because a smaller memory cannot hold enough information for the printer to make correct and efficient swathing decisions.

Apart from cost-cutting concerns, there is also a performance issue facing conventional printers. There are two common bottlenecks that detrimentally impact printer performance. One bottleneck is data I/O (input/output) which is caused by the increasing data requirements for higher resolution black and higher depth color (i.e., more than one bit per pixel). The second bottleneck concerns movement of the printer mechanism. For carriage-type mechanisms, for example, there is a maximum speed at which the print head carriage can be moved and the pen fired.

The current printing process is to wait for the data through the I/O, make the swathing decisions, and then print the data within the swath. The carriage does not move until all of the data for the swath has come through the I/O. Additionally, with a reduced-size memory, the I/O transfer for the next swath must wait until the printing is complete on the previous swath so that the memory is available for reuse.

The inventors have developed a printer system and method that enable use of a reduced-size memory without degrading the ability of the printer to make swath decisions and that reduce I/O and mechanism bottlenecks.

SUMMARY OF THE INVENTION

This invention concerns an improved system and method for sending data to a printer that is equipped with a small memory buffer. As an example, the buffer is sized to hold enough data to print one swath. A printer driver, implemented at a host computer, creates data hints for each swath of data that give the printer sufficient information to prepare the printer to print the swath before the entire set of data for that swath is downloaded from the host computer.

Each data hint contains information that the printer uses to prepare to print a row of pixel data. For instance, the data hint contains a color type to specify whether the row is black only, color only, or a combination of black and color. The data hint also contains information pertaining to the leftmost non-zero pixel position and a rightmost non-zero pixel position to be printed in the row.

The printer has a swath manager configured to receive the data hints and prepare the printer to print the swath data associated with the data hints. The swath manager relies on the data hints to make swathing decisions regarding the color of the pixel rows and where to position the print head carriage (or other print mechanism) in preparation for printing. As a result, the swath manager need not wait for the entire set of data to arrive before making the appropriate swathing decisions. Additionally, the printer can receive the data in parallel with taking steps to prepare to print the data, thereby reducing the classic bottlenecks of I/O and mechanism movement.

BRIEF DESCRIPTION OF THE DRAWINGS

The same reference numbers are used throughout the disclosure to reference like components and features.

DETAILED DESCRIPTION

Figure 1:
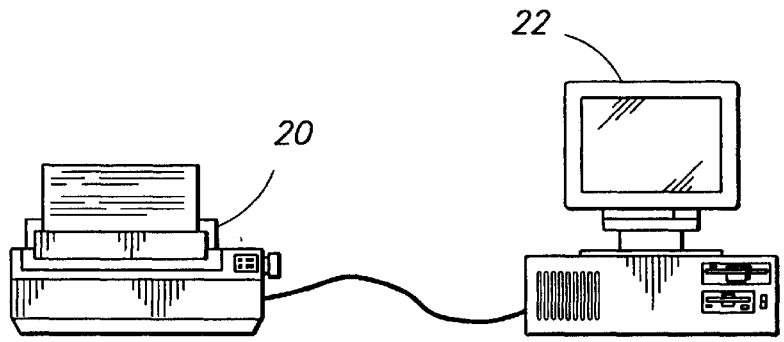
FIG. 1 is a diagrammatic view of a printer and a host computer.

FIG. 1 shows a printer 20 connected to a host computer 22. Preferably, the printer 20 is a color printer that can print both black-and-white images and color images. The printer 20 will be described in this disclosure within the context of an inkjet printer. However, the printer 20 can be implemented as many different types of printers, such as laser printers, dot matrix printers, and thermal printers. Although the invention is described in the context of printers, it may be used in conjunction with other apparatuses with printing devices, such as photocopiers, scanners, facsimile machines, and the like.

Figure 2:
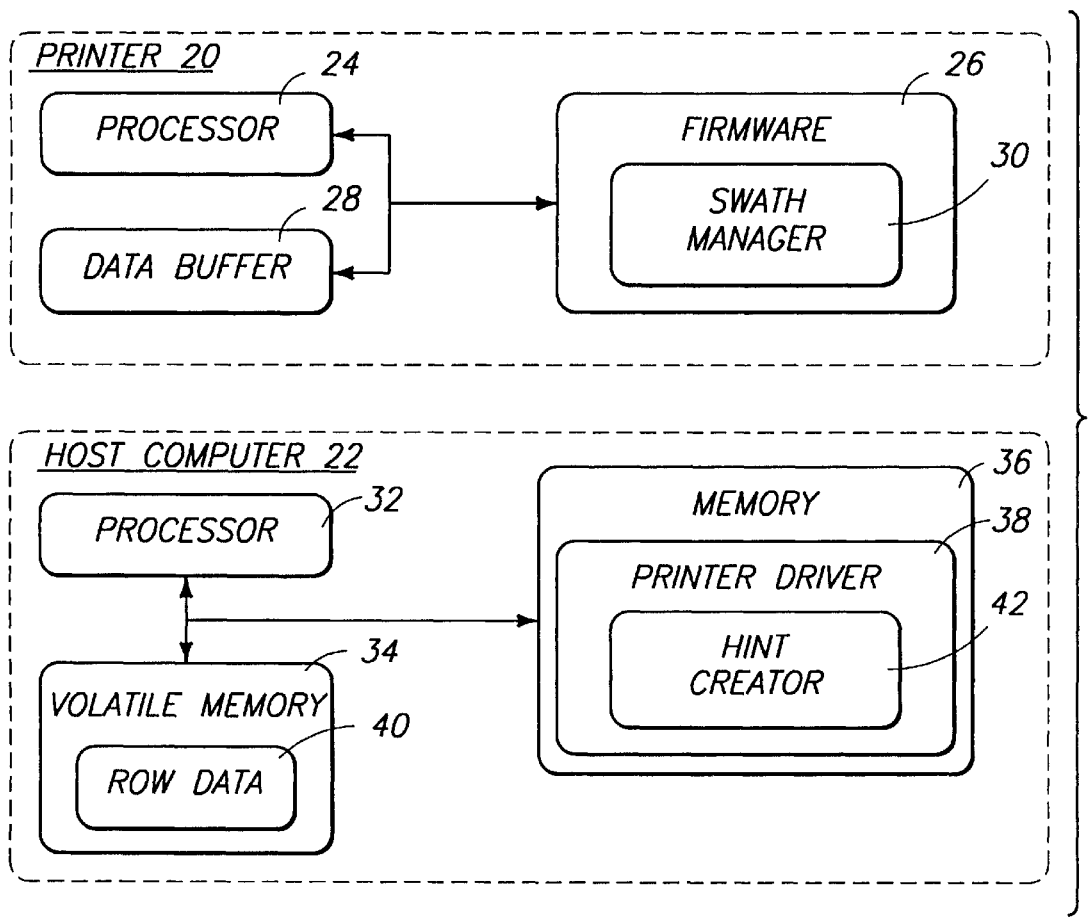
FIG. 2 is a block diagram of the printer and the host computer.

FIG. 2 shows a functional block diagram of the printer and host computer. The printer 20 has a processor 24 and firmware 26 (e.g., ROM, PROM, EPROM, Flash, etc.). The printer 20 also includes a data buffer 28 formed of volatile memory (i.e., RAM) to store data to be printed. The data buffer 28 is preferably sized to hold at least one swath of data at 600 dpi (dots per inch). An example size of the data buffer is 512 Kbytes.

A swath manager 30 is stored in firmware 26 and executes on processor 24. The swath manager 30 manages the printer mechanisms during the printing of each swath. For example, the swath manager 30 directs the paper handling system to position the print media at an appropriate position, instructs the carriage mechanism to locate the print head at a starting location, and so forth.

The host computer 22 has a processor 32, a volatile memory 34 (i.e., RAM), and a non-volatile memory 36 (e.g., ROM, hard disk, floppy disk, CD-ROM, etc.). A printer driver 38 is stored in memory 36 and executes on processor 32. The printer driver 38 constructs row data 40 for printing each row in a printing swath, and sends that data to the printer 20. The row data 40 is stored in the buffer 28 at the printer 20 and used to print characters or images on the print media.

As an example, data in a color printer includes data for the color pen and data for the black pen. A color pen typically has three colors (e.g., cyan, magenta, and yellow). For each color plane, the driver specifies a depth value that dictates how little or how much of that color is deposited. Assuming the depth value is a two-bit value and the color pen operates at a resolution of 300 dpi, there are 600 bits per linear inch of data for each color plane in a single row of dots. This yields a total of 1,800 bits per linear inch for the entire three-plane color data.

The black pen is operated at a higher resolution of 600 dpi. It contains one bit for each dot, which specifies either on or off. Two rows of the 600 dpi black data can be accommodated with the one row of 300 dpi color data. Accordingly, in this example, there are 1,200 bits per linear inch of black data. Combining the color data and black data, the driver builds each row of KCMY (Black, Cyan, Magenta, and Yellow) data at 3,000 bits per linear inch, or 24,000 bits per 8" swath.

According to prior art techniques, the printer driver had to download the entire data set to print one or more swaths before the printer could make swathing decisions, such as color and pixel boundaries. According to aspects of this invention, however, the printer driver 38 is configured to create data hints for each row of pixel data that gives the swath manager sufficient information to prepare the printer to print the data before all of the swath data is downloaded from the host computer.

The printer driver 38 has a hint creator 42 to create the data hints that are sent to the printer to prepare it for receiving the data. Preferably, the hint creator 42 creates a data hint for an associated set of data to be printed. As one example, the hint creator 42 creates one data hint for each pixel row of data. For printing black only at a resolution of 300 dpi, for example, the hint creator 42 generates 300 hints for the black data.

The data hints contain information that the swath manager 30 uses to prepare the printer to print a row of characters or images. For instance, the data hints contain a color type to specify whether the row is black only, color only, or a combination of black and color. The swath manager relies on the data hints to make swathing decisions regarding the color of the row. As a result, the swath manager need not wait for the entire row of data to arrive before determining the color content of the row.

The data hint also contains information pertaining to the leftmost non-zero pixel position and a rightmost non-zero pixel position to be printed in the row. The swath manager uses this information to position the print head carriage (or other print mechanism) to a location in preparation for printing. In this manner, the swath manager 30 can position the print head carriage while the printer is receiving the row of data. The swath manager 30 does not have to wait for the entire row to be downloaded and then determine what are the outer boundary parameters of the pixel data for that row.

The data hints are sent to the printer from the host computer in a manner similar to the way raster rows are sent. The printer driver 38 at the host 22 first sends the configuration instruction to inform the printer 20 of the configuration of the data hints to follow. If the configuration instruction calls for color only, then only color data hints will be sent. If the configuration instruction calls for black only, then only black data hints follow. If the configuration instruction calls for both black and color, then both color and black data hints follow.

The configuration instruction is sent using a PCL escape header format with the following parameters:
<Configuration>
 [<BlackVertRes$_{MSB}$><BlackVertRes$_{LSB}$><BlackHorzRes$_{MSB}$><BlackHorzRes$_{LSB}$>]
 [<ColorVertRes$_{MSB}$><ColorVertRes$_{LSB}$><ColorHorzRes$_{MSB}$><ColorHorzRes$_{LSB}$>]

The escape header identifies the data structure as a configuration instruction for a data hint. The "<configuration>" parameter defines a color type, wherein "1" is for black only, "2" is for color only, and "3" is for black and color only. The ColorVertRes, ColorHorzRes, BlackVertRes, and BlackHorzRes parameters are resolutions of the color and black data to follow. The ColorVertRes and BlackVertRes parameters specify the vertical resolution of the data hints. The ColorHorztRes and BlackHorzRes parameters specify the horizontal resolution and units of measure for the left and right pixel position in the data hints.

As an example, the following configuration instruction is sent to configure the firmware 26 to accept data hints for black only at 300 dpi:

Escape Header<01><01><2C><01><2C>

The values within the angled brackets <> are given in hexadecimal is notation. After the escape header, the first "<01>" byte in the instruction is the color type, which specifies black only. The next "<01><2C>" bytes provide the vertical resolution of the data hints and the last "<01><2C>" bytes define the horizontal resolution of the data hints. Here, joining the most significant value <01> and the least significant value <2C> in both the vertical and horizontal form a vertical value of "012C" (Hex), which is 300 in decimal notation. Accordingly, this instruction specifies the color black at 300 dpi.

As another example, the following instruction is sent to configure the printer firmware 26 to accept data hints for black at 600 dpi and color at 300 dpi:

Escape Header<03><02><58><02><58><01><2C><01><2C>

The printer driver 38 sends the data hints after the configuration instruction. The data hints are sent in a pre-defined data structure that is recognized by the printer 20. The data hint is sent using a PCL escape header format with the following parameters:
<color type>
 [<LeftPixelPos$_{MSB}$><LeftPixelPos$_2$><RightPixelPos$_3$><RightPixelPos$_{LSB}$>]

The escape header identifies the data structure as a data hint. The "<color type>" portion defines a color type, wherein "1" is for black only and "2" is for color only. The LeftPixelPos and RightPixelPos parameters are the positions of the leftmost non-zero pixel and the rightmost non-zero pixel. As an example, the pixel position parameters cover a 27" wide media at 2400 dpi. If the LeftPixelPos is set to the right of the RightPixelPos, the associated row is blank.

As an example, the following data hint is sent for an associated pixel row that is black only, 300 dpi, with the leftmost pixel at ½" pixels (relative to the lefthand edge of the print media), and the rightmost pixel at 8" pixels (relative to the lefthand edge of the print media):

Escape Header<01><00><96><09><60>

Following the escape header, the color type of "<01>" specifies black only. The next "<00><96>" bytes provide the leftmost non-zero pixel position. The hexadecimal value of "0096" converts to a decimal value of 150, which at 300 dpi, equates to a ½" pixel placement. The next "<09><60>" bytes define the rightmost non-zero pixel position. The hexadecimal value of "0960" converts to a decimal value of 2400, which at 300 dpi, equates to an 8" pixel placement.

The number of data hints sent for each page depends on the configuration. The printer driver 38 sends a data hint for every physical pixel row on the page. The printer driver also sends more data hints in the event that multiple data types with different resolutions are used in the same page. For a case where two resolutions are different, the printer driver 38 sends more hints for the higher resolution data. For example, with 600 dpi binary black and 300 dpi color, the printer driver 38 sends two black hints for each color hint to maintain synchronization.

The printer driver sends the data hints prior to sending the associated row data 40. The time span between sending the hints and associated data is configurable in both the printer driver 38 and the swath manager 30. As an example, the data hints are sent with a lead-time of ½" in the vertical direction (i.e., 150 pixel rows for 300 dpi, or 300 pixel rows for 600 dpi). This means that data hints for the next ½" of lines are sent before one row of data is sent.

Figure 3:
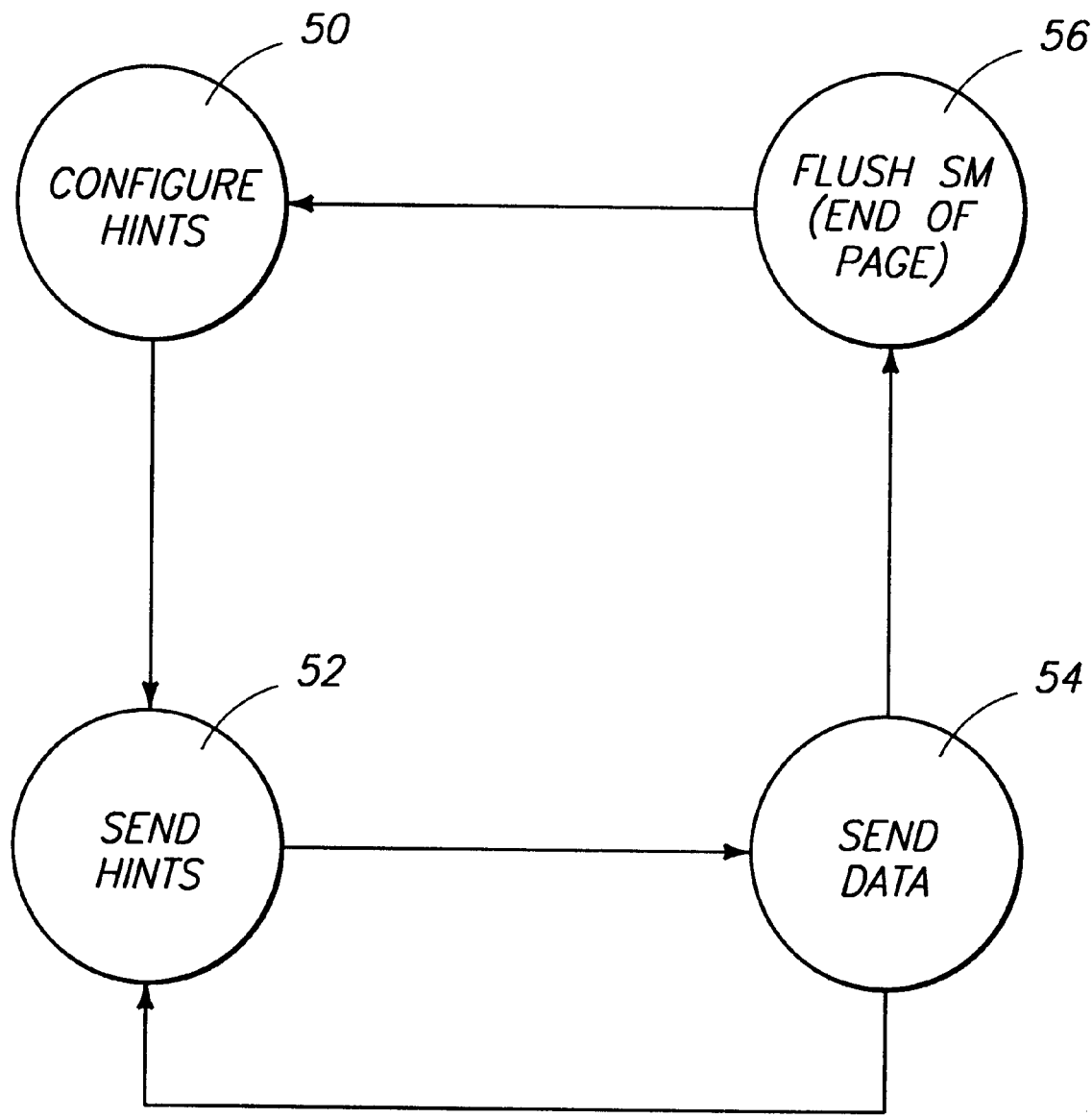
FIG. 3 is a state diagram of a process for supplying data hints and data to the printer.

FIG. 3 shows a state diagram of how the printer driver 38 sends the data hints and associated data. At state 50, the printer driver configures the hints and sends a configuration instruction to the swath manager. At states 52 and 54, the printer driver sends data hints, followed by the associated data rows. This continues until a change in reconfiguration is desired. Changing the configuration involves flushing the swath manager by sending the associated data for all data hints that have been sent to the printer (state 56).

The following are examples of sending data hints and data from the printer driver to the swath manager.

EXAMPLE 1

The raster configuration is black only at 300 dpi:
1. Configure the data hint for Black only at 300 dpi.
   Escape Header<01><01><2C><01><2C>
2. Send data hints for the black data for the next ½" of pixel lines (i.e., 150 hints of black).
3. Send the data for a black row.
4. Send the next hints.

EXAMPLE 2

The raster configuration is black at 600 dpi and color at 300 dpi:
1. Configure the data hint to black at 600 dpi and color at 300 dpi.
   Escape Header<03><02><58><02><58><01><2C><01><2C>
2. Send data hints for the black and color data for the next ½" (i.e., 150 hints of color and 300 hints of black).
3. Send the data for the color and black rows (two rows of 600 dpi black and one row of 300 dpi color).
4. Send the hints for color and black (one hint for color and two hints for black).

This system and method of this invention are advantageous in that they enable the printer to make swathing decisions before the entire set of swath data arrives. This allows the printer to be constructed with smaller buffer memory, thereby reducing costs of manufacture. Another benefit is that the printer can receive the data in parallel with taking steps to prepare to print the data (such as moving the carriage). This parallel process reduces the bottlenecks of data I/O and moving the print head carriage (or other mechanism).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for sending data to a printer comprising the following:
   creating a data hint for an associated data subset of the data to be printed, the data hint containing information to prepare the printer to print the associated data subset;
   sending the data hint to the printer prior to the associated data subset to prepare the printer to print the associated data subset; and
   wherein the creating comprises forming a data hint that contains a color type specifying one or more colors to be printed by the associated data subset.

2. A method as recited in claim 1, further comprising the step of preparing the printer to print the data according to the information contained in the data hint.

3. A method as recited in claim 2, further comprising the step of sending the associated data subset subsequent to the data hint.

4. A method for sending data to a printer comprising the following:
   creating a data hint for an associated data subset of the data to be printed, the data hint containing information to prepare the printer to print the associated data subset;
   sending the data hint to the printer prior to the associated data subset to prepare the printer to print the associated data subset; and
   wherein the creating comprises forming a data hint that contains information specifying a leftmost non-zero pixel position and a rightmost non-zero pixel position to be printed by the associated data subset.

5. A method for sending data to a printer comprising the following:
   creating a data hint for an associated data subset of the data to be printed, the data hint containing information to prepare the printer to print the associated data subset;
   sending the data hint to the printer prior to the associated data subset to prepare the printer to print the associated data subset; and
   wherein the creating comprises forming a data hint that contains (1) a color type specifying one or more colors to be printed by the associated data subset, (2) a leftmost non-zero pixel position to be printed by the associated data subset, and (3) a rightmost non-zero pixel position to be printed by the associated data subset.

6. A method for sending data to a printer comprising the following:
   creating a data hint for an associated data subset of the data to be printed, the data hint containing information to prepare the printer to print the associated data subset;
   sending the data hint to the printer prior to the associated data subset to prepare the printer to print the associated data subset; and
   wherein the creating comprises forming a configuration instruction to inform the printer that the data hint is following.

7. A method as recited in claim 6, wherein the forming comprises forming a configuration instruction that contains a color type specifying one or more colors to be printed by the associated data subset.

8. A method as recited in claim 6, wherein the forming comprises forming a configuration instruction that contains parameters specifying a resolution at which the associated data subset is to be printed.

9. A computer-readable medium having computer-executable instructions for performing the step as recited in claim 1.

10. A method for sending data to a printing device comprising sending, prior to the data, a data hint for an associated data subset of the data to be printed, the data hint containing information to prepare the printing device to print the associated data subset; and wherein the sending comprises sending a data hint that contains a color type specifying one or more colors to be printed.

11. A method for sending data to a printing device comprising sending, prior to the data, a data hint for an associated data subset of the data to be printed, the data hint containing information to prepare the printing device to print the associated data subset; and wherein the sending comprises sending a data hint that contains information specifying a leftmost non-zero pixel position and a rightmost non-zero pixel position to be printed.

12. A driver for providing data to a printer, the driver being configured to create a data hint for an associated data subset of the data which represents a portion of a page of data to be printed, the data hint containing information to prepare the printer to print the associated data subset, the driver sending the data hint to the printer prior to the associated data; and wherein the data hint contains a color type specifying one or more colors to be printed by the associated data subset.

13. A driver for providing data to a printer, the driver being configured to create a data hint for an associated data subset of the data which represents a portion of a page of data to be printed, the data hint containing information to prepare the printer to print the associated data subset, the driver sending the data hint to the printer prior to the associated data; and wherein the data hint contains information specifying a leftmost non-zero pixel position and a rightmost non-zero pixel position to be printed by the associated data subset.

14. A driver for providing data to a printer, the driver being configured to create a data hint for an associated data subset of the data which represents a portion of a page of data to be printed, the data hint containing information to prepare the printer to print the associated data subset, the driver sending the data hint to the printer prior to the associated data; and wherein the data hint contains (1) a color type specifying one or more colors to be printed by the associated data subset, (2) a leftmost non-zero pixel position to be printed by the associated data subset, and (3) a rightmost non-zero pixel position to be printed by the associated data subset.

15. A driver for providing data to a printer, the driver being configured to create a data hint for an associated data subset of the data which represents a portion of a page of data to be printed, the data hint containing information to prepare the printer to print the associated data subset, the driver sending the data hint to the printer prior to the associated data; and wherein the driver is further configured to create a configuration instruction to inform the printer that the data hint is following.

16. A driver as recited in claim 15, wherein the configuration instruction contains a color type specifying one or more colors to be printed by the associated data subset.

17. A driver as recited in claim 15, wherein the configuration instruction contains parameters specifying resolutions of one or more colors to be printed by the associated data subset.

18. A swath manager for a printer, the swath manager being configured to receive a data hint that contains information to prepare the printer to print an associated data set to be received after the data hint, the swath manager preparing the printer to print the associated data set according to the data hint.

19. A swath manager as recited in claim 18, wherein the data hint contains a color type specifying one or more colors to be printed by the associated data set and the swath manager prepares the printer to print the color type contained in the data hint.

20. A swath manager as recited in claim 18, wherein the data hint contains information specifying a leftmost non-zero pixel position and a rightmost non-zero pixel position to be printed by the associated data set and the swath manager prepares the printer to print within a range between the leftmost non-zero position and the rightmost non-zero position.

21. A printer comprising the swath manager as recited in claim 18.

22. A data structure embodied in a computer-readable medium, comprising:

a header portion to identify the data structure as a printer data hint that contains information to prepare a printer to print an associated data set;

a color portion to specify one or more colors to be printed by the associated data set; and a format portion to specify a leftmost non-zero pixel position and a rightmost non-zero pixel position to be printed by the associated data set.

23. A method for sending data to a printer comprising the following:

creating a data hint for an associated data subset of the data to be printed, the data hint containing information to prepare the printer to print the associated data subset;

sending the data hint to the printer prior to the associated data subset to prepare the printer to print the associated data subset;

wherein the creating comprises forming a data hint that contains a color type specifying one or more colors to be printed by the associated data subset; and wherein the data hint contains information to prepare the printer to print a swath of the associated data subset.

* * * * *